United States Patent
Li et al.

(10) Patent No.: US 11,945,752 B1
(45) Date of Patent: Apr. 2, 2024

(54) BARIUM SLAG-MODIFIED ALUMINATE QUICK-HARDENING SPECIAL CEMENTING MATERIAL AND PREPARATION METHOD THEREOF

(71) Applicant: Institute of Rock and Soil Mechanics, Chinese Academy of Sciences, Wuhan (CN)

(72) Inventors: Jiangshan Li, Wuhan (CN); Qiang Xue, Wuhan (CN); Xin Chen, Wuhan (CN)

(73) Assignee: Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 0 days.

(21) Appl. No.: 18/487,622

(22) Filed: Oct. 16, 2023

(30) Foreign Application Priority Data

Oct. 26, 2022 (CN) .......................... 202211320649.2

(51) Int. Cl.
- *C04B 28/14* (2006.01)
- *C04B 18/14* (2006.01)
- *C04B 103/12* (2006.01)

(52) U.S. Cl.
CPC .......... *C04B 28/143* (2013.01); *C04B 18/141* (2013.01); *C04B 2103/12* (2013.01)

(58) Field of Classification Search
CPC .. C04B 28/143; C04B 18/141; C04B 2103/12
See application file for complete search history.

(56) References Cited

FOREIGN PATENT DOCUMENTS

| | | |
|---|---|---|
| CN | 1223626 A | 7/1999 |
| CN | 104788031 A | 7/2015 |
| CN | 109748567 A | 5/2019 |

*Primary Examiner* — Anthony J Green
(74) *Attorney, Agent, or Firm* — Nitin Kaushik

(57) ABSTRACT

Disclosed are a barium slag-modified aluminate quick-hardening special cementing material and a preparation method thereof, wherein the raw materials for the preparation of the barium slag-modified aluminate quick-hardening special cementing material includes, in parts by weight: 10-12 parts of aluminate cement clinker, 2-3 parts of barium slag powder, 1.5-2 parts of sulfate material, and 0-1.5 parts of early-setting agent. The present invention, on the basis of ensuring the original advantages of aluminate cement, can increase the long-term strength, durability, and economy, and solve the possible environmental problems caused by the barium slag, making it more suitable for use in various engineering projects.

2 Claims, 1 Drawing Sheet

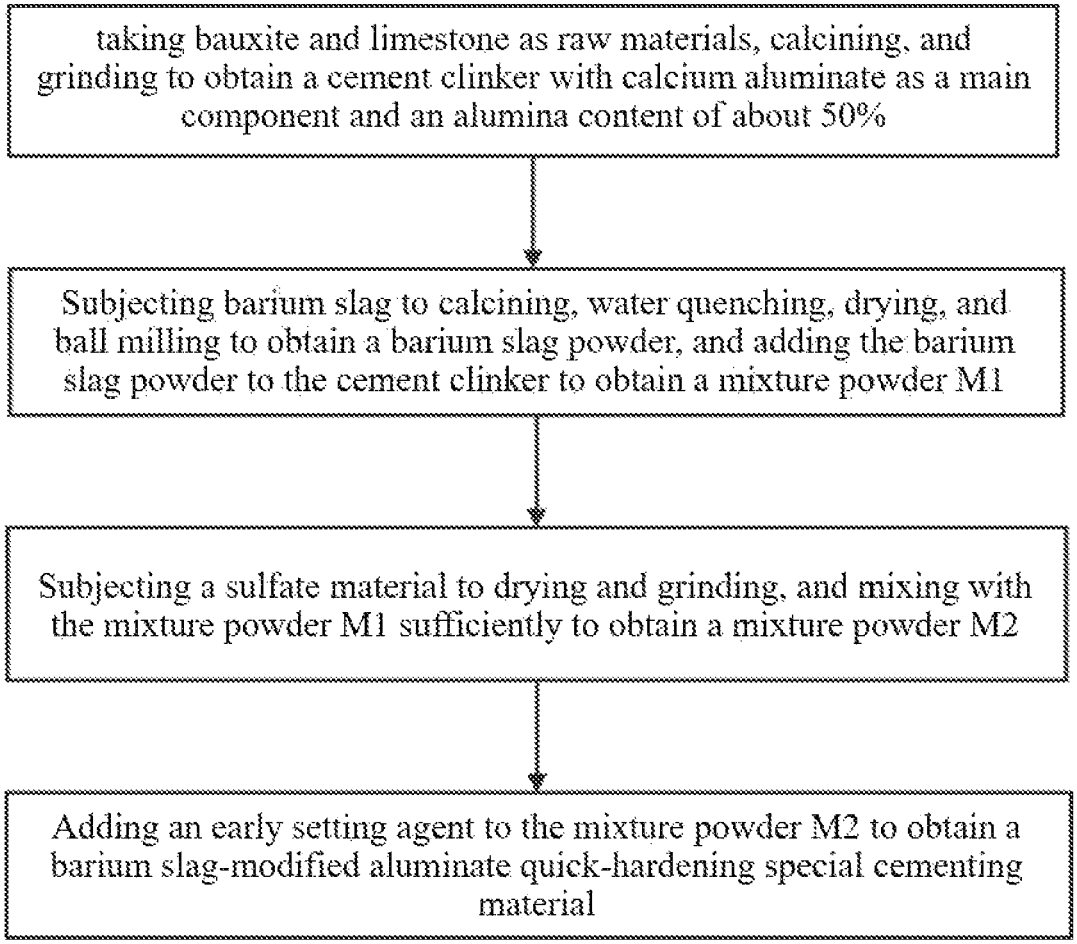

BARIUM SLAG-MODIFIED ALUMINATE QUICK-HARDENING SPECIAL CEMENTING MATERIAL AND PREPARATION METHOD THEREOF

CROSS-REFERENCE TO RELATED APPLICATIONS

The application claims priority to Chinese patent application No. 202211320649.2, filed on Oct. 26, 2022, the entire contents of which are incorporated herein by reference.

TECHNICAL FIELD

The present invention relates to the technical field of building materials, in particularly, to a barium slag-modified aluminate quick-hardening special cementing material and preparation method thereof.

BACKGROUND

As a special type of cement, aluminate cement has the characteristics of quick hardening, high strength, and high fire resistance, and is commonly used in projects with urgent construction periods or winter construction. However, the long-term strength and other properties of aluminate cement tend to decrease, with a long-term strength reduction of about 40%-50%, making it unsuitable for long-term load-bearing structures, seriously restricting its promotion and application. The main reason for the strength decrease of aluminate cement in the later stage is that the hydration products $CAH_{10}$ and $C_2AH_8$ formed in the earlier stage are transformed into $C_3AH_6$ under the action of high temperature and water. Therefore, controlling the phase transformation reaction to generate new materials is beneficial to solving the problem of strength reduction.

Barium slag is an industrial waste generated during the production of barium carbonate from barite. It is classified as hazardous solid waste due to its high content of water-soluble and acid-soluble barium ions. The annual discharge of barium slag in China is about 1 million tons, and the vast majority of barium slag is treated by stacking, which not only occupies a large amount of land for a long time but also poses high environmental risks due to infiltration.

The existing structural reinforcement materials have the drawbacks of low long-term strength and low durability. The application number CN102295447A entitled "Quick-hardening early-strength structure reinforcement material based on aluminate cement and steel slag" addresses the problem of low early-strength of silicate cement-based reinforcement materials. However, the addition of aluminate cement clinker does not guarantee its durability, especially in high-temperature environments, which may cause the strength of structures to become unstable.

Therefore, there is an urgent need to develop a barium slag-modified aluminate quick-hardening special cementing material that can solve the above technical problems.

SUMMARY

The object of the present invention is to provide a barium slag-modified aluminate quick-hardening special cementing material and a preparation method thereof, which, on the basis of ensuring the original advantages of aluminate cement, can increase the long-term strength, durability, and economy, and solve the possible environmental problems caused by barium slag, making it more suitable for use in various engineering projects.

In order to achieve the above object, the present invention adopts the following technical scheme:

In a first aspect of the present invention, provided is a barium slag-modified aluminate quick-hardening special cementing material, comprising, in parts by weight, the following raw materials for the preparation of the barium slag-modified aluminate quick-hardening special cementing material:

10-12 parts of aluminate cement clinker, 2-3 parts of barium slag powder, 1.5-2 parts of sulfate material, and 0-1.5 parts of early-setting agent.

Further, the sulfate material includes at least one of sodium sulfate, calcium sulfate, aluminum sulfate, potassium sulfate, phosphogypsum, gypsum, anhydrite, and celestite.

The aluminate cement clinker is prepared from bauxite and limestone as raw materials by calcining to obtain a clinker with calcium aluminate as a main component and aluminum oxide content of about 50%, followed by grinding to obtain a hydraulic cementing material.

Further, the early-setting agent includes at least one of calcium hydroxide, sodium hydroxide, sodium carbonate, sodium sulfate, lime, quicklime, carbide slag, and mirabilite.

Further, the mass proportion of the tricalcium aluminate in the aluminate cement clinker is 20-40 wt %.

Further, the ratio of the molar mass of non-barium sulfate $Ba^{2+}$ in the barium slag powder to the molar mass of $SO_4^{2-}+PO_4^{3-}$ ions in the sulfate material is 1:1.

Further, the method for preparing the barium slag powder includes:

obtaining a black barium slag powder satisfying that, according to the GB 5085.3-2007 test, the leaching concentration of $Ba^{2+}$ from black barium slag powder in an acidic solution with a liquid-solid ratio of 10:1 is 1500-2300 mg/L; and subjected the black barium slag powder to calcining at 800-1200° C., water quenching, drying, and ball milling, and passing through a 200-mesh sieve to obtain the barium slag powder.

the barium slag powder includes $BaCO_3$, $BaSiO_3$, $BaSO_3$, $Ba(FeO_2)_2$, $BaSO_4$, and $CaSiO_3$, with the mass fraction of BaO in the black barium slag being above 65%.

In a second aspect of the present invention, provided is a method for preparing the barium slag-modified aluminate quick-hardening special cementing material, comprising:

mixing, in parts by weight, 10-12 parts of an aluminate cement clinker, 2-3 parts of barium slag powder, 1.5-2 parts of sulfate material, and 0-1.5 parts of early-setting agent, and then adding water and stirring until uniform to obtain the barium slag-modified aluminate quick-hardening special cementing material.

One or more technical solutions in the embodiments of the present invention have at least the following technical effects or advantages:

An embodiment of the present invention provides a barium slag-modified aluminate quick-hardening special cementing material and a preparation method thereof, which, on the basis of ensuring the original advantages of aluminate cement, increases its long-term strength, durability, and economy, and solves the possible environmental problems caused by barium slag, specifically:

(1) the barium slag-modified aluminate quick-hardening special cementing material has a very high strength at day 3 (the 3d compressive strength is above 60 MPa;

the 14d compressive strength is above 65 MPa), and the paste specimen strength is about 1.5-2 times of that of a single aluminate cement clinker. The principle is: in the aluminate cement, $Ba^{2+}$ in the barium slag and $SO_4^{2-}+PO_4^{3-}$ in the sulfate generate framework materials barium sulfate and barium phosphate in the early stage, to which the sulfate component is added, reacted with $C_3AH_6$ component produced in aluminate cement clinker which is unfavorable to the strength in the early stage, and form an ettringite which is favorable to the early-strength.

(2) The barium slag-modified aluminate quick-hardening special cementing material provided in the present invention has no substantial strength reduction in the later stage and has a compressive strength of about 75 MPa after 90 days. The principle is: in the barium slag-modified aluminate quick-hardening special cementing material provided in the present invention, the framework material barium sulfate formed at the early stage has an inhibitory effect on the conversion of the hydration products $CAH_{10}$ and $C_2AH_8$ with higher strength to the material $C_3AH_6$ with lower strength. As the hydration reaction proceeds, the carbonate ions provided by the barium slag react with free calcium ions in the system to form calcium carbonate, and the calcium carbonate will react with $C_3AH_6$ (tricalcium aluminate hydrate is formed after the hydration of the aluminate cement clinker) to form $CO_3$-AFM. At the same time, in an overbased system, the active silica component in the barium slag is excited to react with the calcium aluminate in the cement to form C—S—H and C-A-S—H. Further, the early generated barium sulfate is reacted with the calcium sulfate generated in the system to form tricalcium aluminate to generate a barium calcium sulphoaluminate mineral, providing later strength.

(3) The present invention solves the environmental problems arising from hazardous solid waste barium slag, and the leaching rate of heavy metal barium ions in the instant aluminate quick-hardening special cementing material is far below the relevant national standards.

The aluminate quick-hardening special cementing material provided in the present invention has a strong binding capacity for barium ions, and free barium ions will replace calcium ions in the cement hydration product to form the barium calcium sulphoaluminate mineral, so as to realize the resource utilization of hazardous solid wastes, which has the dual benefits of environment and economy and has a broad application prospect.

(4) The barium slag-modified aluminate quick-hardening special cementing material provided in the present invention has strong resistance to brine erosion and carbonization.

The minerals mainly providing strength in the present invention are hydration products such as calcium carbonate, barium sulfate, and ettringite. Since such minerals have strong resistance to brine erosion and carbonization, the barium slag-modified aluminate quick-hardening special cementing material has strong resistance to brine erosion and carbonization and can be used as building materials in various environments.

BRIEF DESCRIPTION OF DRAWINGS

In order to more clearly illustrate the technical solutions of the embodiments of the present invention, a brief description will be given below of the accompanying drawings which are required to be used in the description of the embodiments. It is obvious that the drawings in the description below are some embodiments of the present invention, and it would be obvious for a person skilled in the art to obtain other drawings according to these drawings without involving any inventive effort.

The FIGURE is a flowchart of a method for preparing barium slag-modified aluminate quick-hardening special cementing material provided in Example 6 of the present invention.

DETAILED DESCRIPTION OF THE EMBODIMENTS

The following will elaborate on the present invention in conjunction with specific embodiments and examples, and the advantages and various effects of the present invention will be presented more clearly. Those skilled in the art should understand that these specific embodiments and examples are intended to illustrate the present invention, rather than limiting it.

Throughout the specification, terms used herein should be understood as generally used in the art, unless otherwise indicated. Unless otherwise defined, all technical and scientific terms used herein have the same meaning as commonly understood by one skilled in the art to which this invention belongs. In case of conflict, the present specification shall control.

Unless otherwise specifically noted, the various starting materials, reagents, instruments, equipment, and the like used in the present invention are either commercially available or may be prepared by known methods.

The overall idea of the present invention is as follows:

According to an exemplary embodiment of the present invention, provided is a barium slag-modified aluminate quick-hardening special cementing material, comprising, in parts by weight, the following raw materials for the preparation of the barium slag-modified aluminate quick-hardening special cementing material:

10-12 parts of aluminate cement clinker, 2-3 parts of barium slag powder, 1.5-2 parts of sulfate material, and 0-1.5 parts of early-setting agent.

The present invention provides a barium slag-modified aluminate quick-hardening special cementing material, in which each component cooperates:

(1) $Ba^{2+}$ in the barium slag and $SO_4^{2-}+PO_4^{3-}$ in the sulfate generate framework materials barium sulfate and barium phosphate in the early stage, to which sulfate component is added, reacted with $C_3AH_6$ component produced in aluminate cement clinker which is unfavorable to the strength in the early stage, and form an ettringite which is favorable to the early strength, so that the barium slag-modified aluminate quick-hardening special cementing material has a very high strength at day 3 (the 3d compressive strength is above 60 MPa; the 14d compressive strength is above 6 5 MPa), and the neat strength is about 1.5-2 times of that of a single aluminate cement clinker. The reaction equations involved include:

$$Ba^{2+}+SO_4^{2-}=BaSO_4$$

$$Ba^{2+}+PO_4^{3-}=Ba_3(PO_4)_2$$

$$SO_4^{2-}+Ca^{2+}+2H_2O=CaSO_4\cdot 2H_2O$$

$$3C_3AH_6+3(CaSO_4\cdot 2H_2O)+8H_2O=3CaO\cdot Al_2O_3\cdot 3CaSO_4\cdot 32H_2O;$$

(2) Barium sulfate is generated from barium slag powder and sulfate materials in the early stage, which inhibits the conversion of the hydration products $CAH_{10}$ and $C_2AH_8$ with higher strength to the material $C_3AH_6$ with lower strength. As the hydration reaction proceeds, carbonate ions provided by barium slag react with free calcium ions in the system to form calcium carbonate, which will react with $C_3AH_6$ to form $CO_3$-AFM. At the same time, in an overbased system, the active calcium silicate component in the barium slag is excited and reacts with water and active aluminum in the cementing material to form C—S—H and C-A-S—H. Further, the early generated barium sulfate is reacted with the calcium sulfate generated in the system to form tricalcium aluminate to generate a barium calcium sulphoaluminate mineral, providing later strength. The reaction equations involved include:

$Ca^{2+}+CO_3^{2-}=CaCO_3$ $CaCO_3+C_3AH_6+6H_2O=CO_3\text{-AFM}$ $C_3S+nH+AH=C\text{-}(A)\text{-}S\text{—}H+mCH;$ If too little barium slag powder is added, it will have a significant adverse effect on the strength regression in the later stage; If too much barium slag powder is added, it will have an adverse effect on the material's high fluidity; If too little sulfate material is added, it will have adverse effects on high barium ion leaching; If too much sulfate material is added, it will have an adverse effect on the material's high expansion;

The sulfate material includes at least one of sodium sulfate, calcium sulfate, aluminum sulfate, potassium sulfate, phosphogypsum, gypsum, anhydrite, and celestite; preferably phosphogypsum.

The early-setting agent includes at least one of calcium hydroxide, sodium hydroxide, sodium carbonate, sodium sulfate, lime, quicklime, carbide slag, and mirabilite; preferably the carbide slag.

The mass proportion of tricalcium aluminate in the aluminate cement clinker is 20-40 wt %.

The ratio of the molar mass of $Ba^{2+}$ in the barium slag powder to the molar mass of $SO_4^{2-}+PO_4^{3-}$ ions in the sulfate material is 1:1. The reason why the molar mass ratio is 1:1 is that $Ba^{2+}$ forms a poorly soluble precipitate, controlling the leaching of $Ba^{2+}$.

The preparation method of the barium slag powder includes:
  obtaining a black barium slag powder satisfying that, according to GB 5085.3-2007 test, the leaching concentration of $Ba^{2+}$ from black barium slag powder in an acidic solution with a liquid-solid ratio of 10:1 is 1500-2300 mg/L; and
  subjecting the black barium slag powder to calcining at 800-1200° C., ball milling, and passing through a 200-mesh sieve to obtain the barium slag powder.

If the $Ba^{2+}$ leaching concentration is less than 1500 mg/L, it cannot suppress the adverse effects of material strength degradation in the later stage, and if it is greater than 2300 mg/L, it has adverse effects such as high material fluidity and high environmental harm.

The reason for passing through the 200-mesh sieve after ball milling is to sufficiently excite the properties of the cementing material.

According to a typical embodiment of the present invention, provided is a method for preparing the barium slag-modified aluminate quick-hardening special cementing material, comprising:
  mixing, in parts by weight, 10-12 parts of aluminate cement clinker, 2-3 parts of barium slag powder, 1.5-2 parts of sulfate material, and 0-1.5 parts of early-setting agent, and then adding water and stirring until uniform to obtain the barium slag-modified aluminate quick-hardening special cementing material.

The weight of the added water is 0.3-0.5 of the mass of solids, most preferably the optimal water cement ratio of the cementing material.

The following will provide a detailed explanation of a barium slag-modified aluminate quick-hardening special cementing material and its preparation method in this application, combined with embodiments and experimental data.

Example 1

This example provides a barium slag-modified aluminate quick-hardening special cementing material prepared from raw materials including: 10 parts of aluminate cement clinker, 2 parts of barium slag powder, 2 parts of phosphogypsum powder, and 0 parts of early-setting agent. Wherein the content of tricalcium aluminate in the aluminate cement clinker was 25%; the barium slag powder was black barium slag powder; the particle size of the barium slag powder after ball milling was controlled by passing through a 200-mesh sieve; the leaching concentration of the $Ba^{2+}$ in an acidic solution with a liquid-solid ratio of 10:1 was 1980 mg/L.

All the components were mixed with water and stirred to obtain the slag modified aluminate quick-hardening special cementing material.

Example 2

This example provides a barium slag-modified aluminate quick-hardening special cementing material prepared from raw materials including, in parts by weight: 10 parts of aluminate cement clinker, 2 parts of barium slag powder, 1.5 parts of gypsum powder, and 1 part of carbide slag. Wherein the content of tricalcium aluminate in the aluminate cement clinker was 25%; the barium slag powder was black barium slag powder; the particle size of the barium slag powder after ball milling was controlled by passing through a 200-mesh sieve.

All the components were mixed with water and stirred to obtain the slag modified aluminate quick-hardening special cementing material.

Example 3

This example provides a barium slag-modified aluminate quick-hardening special cementing material prepared from raw materials including, in parts by weight: 12 parts of aluminate cement clinker, 3 parts of barium slag powder, 2 parts of gypsum powder, and 0.5 part of carbide slag. Wherein the content of tricalcium aluminate in the aluminate cement clinker was 25%; the barium slag powder was black barium slag powder; the particle size of the barium slag powder after ball milling was controlled by passing through a 200-mesh sieve; the leaching concentration of the $Ba^{2+}$ in an acidic solution with a liquid-solid ratio of 10:1 was 1980 mg/L.

All the components were mixed with water and stirred to obtain the slag modified aluminate quick-hardening special cementing material.

Example 4

This example provides a barium slag-modified aluminate quick-hardening special cementing material prepared from raw materials comprising, in parts by weight:

10-12 parts of aluminate cement clinker, 4-5 parts of mixture powder, and 1 part of early-setting agent; the method for preparing the mixture powder included: thoroughly mixing a wet barium slag with wet phosphogypsum (the ratio of the molar mass of $Ba^{2+}$ in the non-barium sulfate in the wet barium slag to the molar mass of $SO_4^{2-}$+$PO_4^{3-}$ ions in the wet phosphogypsum being 1:1) to obtain a mixture material; subjecting the mixture material to stirring, standing, drying and grinding to obtain the mixture powder;

The stirring time was 12 h. The particle size of the mixture powder was controlled by passing through a 200-mesh sieve. The standing time was 5 d. The molar mass ratio of $Ba^{2+}$ in the wet barium slag to $SO_4^{2-}$+$PO_4^{3-}$ ions in the wet phosphogypsum was 1:1.

Comp. Ex. 1

This comparative example was 100% aluminate cement clinker.

Comp. Ex. 2

The comparative example included 10 parts of aluminate cement clinker and 2 parts of phosphogypsum powder.

Experimental Example 1

The setting times of the barium slag-modified aluminate quick-hardening special cementing material of Examples 1-4 (water cement ratio of 0.42) and the 100% aluminate cement clinker of Comp. Ex. 1 were tested. The setting time test was performed according to the specification of GBT 1346-2011, and the initial and final setting times are shown in Table 1 below.

TABLE 1

The initial and final setting time of each material, h

| Group | Initial setting time (h) | Final setting time (h) |
|---|---|---|
| Ex. 1 | 15 | 19 |
| Ex. 2 | 6 | 8 |
| Ex. 3 | 11 | 14 |
| Ex. 4 | 6 | 8 |
| Comp. Ex. 1 | 5 | 6 |
| Comp. Ex. 2 | 6 | 8 |

It can be seen from the data in Table 1 that:

After adding modifiers such as the barium slag and sulfate, the final initial setting time of the aluminate cement clinker can be extended, making it difficult for barium slag-modified aluminate quick-hardening special cementing materials to quickly obtain early strength. However, after adding the early-setting agent calcium carbide slag, the initial and final setting times of barium slag-modified aluminate quick-hardening special cementing materials are close to the original initial and final setting times. An appropriate amount of early-setting agent can be added according to actual needs.

Experimental Example 2

The compressive strength of the barium slag-modified aluminate quick-hardening special cementing material of Ex. 1-4 (water cement ratio of 0.42) and the 100% aluminate cement clinker of Com. Ex. 1-2 was tested, specifically including: preparing the cement mortar sample according to GB/T201-2015, demolding after 24 h at room temperature, and putting it into a curing box at 20° C. for curing. The compressive strengths are shown in Table 2 below.

TABLE 2

Compressive strength at different ages of each material, MPa

| Group | 3 d | 7 d | 14 d | 28 d | 60 d | 90 d |
|---|---|---|---|---|---|---|
| Ex. 1 | 64.2 | 68.2 | 69.5 | 71.4 | 72.2 | 72.9 |
| Ex. 2 | 68.1 | 70.2 | 71.5 | 73.4 | 74.3 | 74.6 |
| Ex. 3 | 69.3 | 70.5 | 72.1 | 74.2 | 75.5 | 76.2 |
| Ex. 4 | 69.5 | 70.4 | 71.3 | 74.2 | 75.6 | 76.3 |
| Comp. Ex. 1 | 50.3 | 60.5 | 62.3 | 65.4 | 63.8 | 59.7 |
| Comp. Ex. 2 | 51 | 62 | 64 | 65 | 64 | 62 |

As can be seen from the data in Table 2,

Compared with Comp. Ex. 1 and Comp. Ex. 2, the barium slag-modified aluminate quick-hardening special cementing materials of Ex. 1-4 of the present invention have a very high strength at day 3. The 3d compressive strength was above 60 MPa; and the 14d compressive strength was above 65 MPa. The neat strength was about 1.5-2 times of that of a single aluminate cement clinker.

In Comp. Ex. 1 and Comp. Ex. 2, a significant strength reduction was observed after 90 days due to the absence of barium slag modifier, and in Ex. 1-4 of the present invention, the strength still increased at 60-90 days due to the addition of modifier, indicating that the barium slag-modified aluminate quick-hardening special cementing material has long-term stable strength characteristics.

Finally, it should be noted that the terms "include", "comprise", or any other variation thereof are intended to cover non exclusive inclusion, so that a process, method, item, or device that includes a series of elements not only includes those elements, but also other elements that are not explicitly listed, or also include elements inherent in such a process, method, item, or device.

While preferred embodiments of the present invention have been described, additional variations and modifications to these embodiments will occur to those skilled in the art once the basic inventive concept is known. Therefore, it is intended that the appended claims be interpreted as including the preferred embodiments and all alterations and modifications that fall within the scope of the present invention.

It will be apparent to those skilled in the art that various modifications and variations can be made in the present invention without departing from the spirit or scope of the inventions. Thus, provided that these modifications and variations of the present invention fall within the scope of the claims of the present invention and their equivalents, they are also intended to be included.

What is claimed is:

1. A barium slag-modified aluminate quick-hardening cementing material, comprising, in parts by weight, following raw materials for preparation of the barium slag-modified aluminate quick-hardening cementing material: 10-12 parts of aluminate cement clinker, 2-3 parts of barium slag powder, 1.5-2 parts of sulfate material, and an early-setting agent; wherein the early-setting agent is present in an amount greater than zero and up to 1.5 parts and wherein the sulfate material and the early setting agent are different;

the sulfate material includes at least one of sodium sulfate, calcium sulfate, aluminum sulfate, potassium sulfate, phosphogypsum, and celestite;

the early-setting agent comprises at least one of calcium hydroxide, sodium hydroxide, sodium carbonate, sodium sulfate, quicklime, and carbide slag;

a mass proportion of tricalcium aluminate in the aluminate cement clinker is 20-40 wt %;

a ratio of a molar mass of $Ba^{2+}$ in the barium slag powder to a molar mass of $SO_4^{2-}+PO_4^{3-}$ ions in the sulfate material is 1:1;

wherein a method for preparing the barium slag powder comprises:

obtaining a black barium slag powder satisfying that according to GB 5085.3-2007 test, a leaching concentration of $Ba^{2+}$ from the black barium slag powder in an acidic solution with a liquid-solid ratio of 10:1 is 1500-2300 mg/L; and subjecting the black barium slag powder to calcining at 800-1200° C., a ball milling and passing through a 200-mesh sieve to obtain the barium slag powder.

2. A method for preparing a barium slag-modified aluminate quick-hardening cementing material, comprising:

mixing, in parts by weight, 10-12 parts of aluminate cement clinker, 2-3 parts of barium slag powder, 1.5-2 parts of sulfate material, and an early-setting agent, and then adding water and stirring until uniform to obtain the barium slag-modified aluminate quick-hardening cementing material, wherein the early-setting agent is present in an amount greater than zero and up to 1.5 parts and wherein the sulfate material and the early setting agent are different; and wherein a mass ratio of the added water to solid components is 0.3-0.5.

* * * * *